Dec. 3, 1935.   C. B. HERRICK   2,023,323
POTATO CUTTER AND PLANTER
Filed Jan. 21, 1935   2 Sheets-Sheet 1
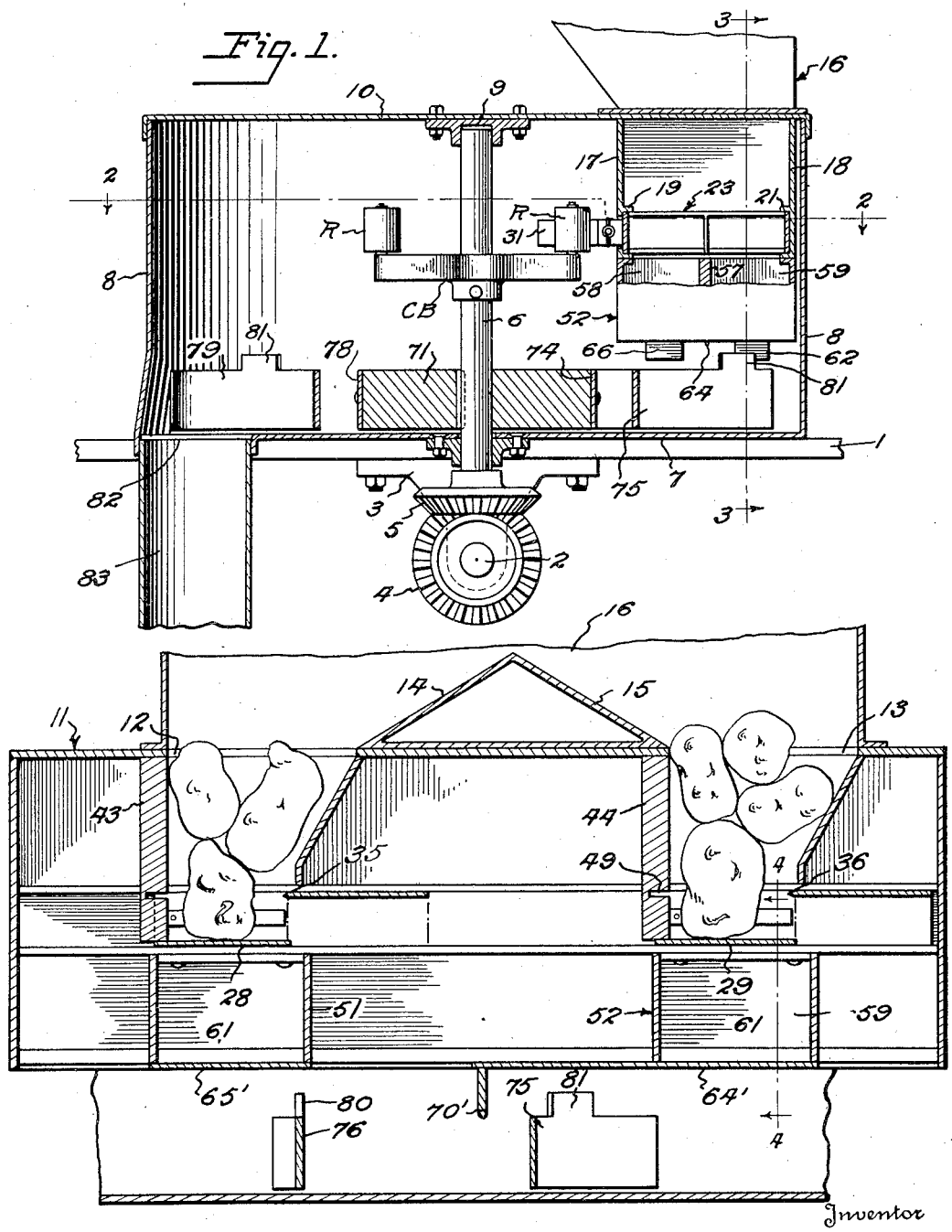
Inventor
Charles B. Herrick Dec. 3, 1935.  C. B. HERRICK  2,023,323
POTATO CUTTER AND PLANTER
Filed Jan. 21, 1935  2 Sheets-Sheet 2
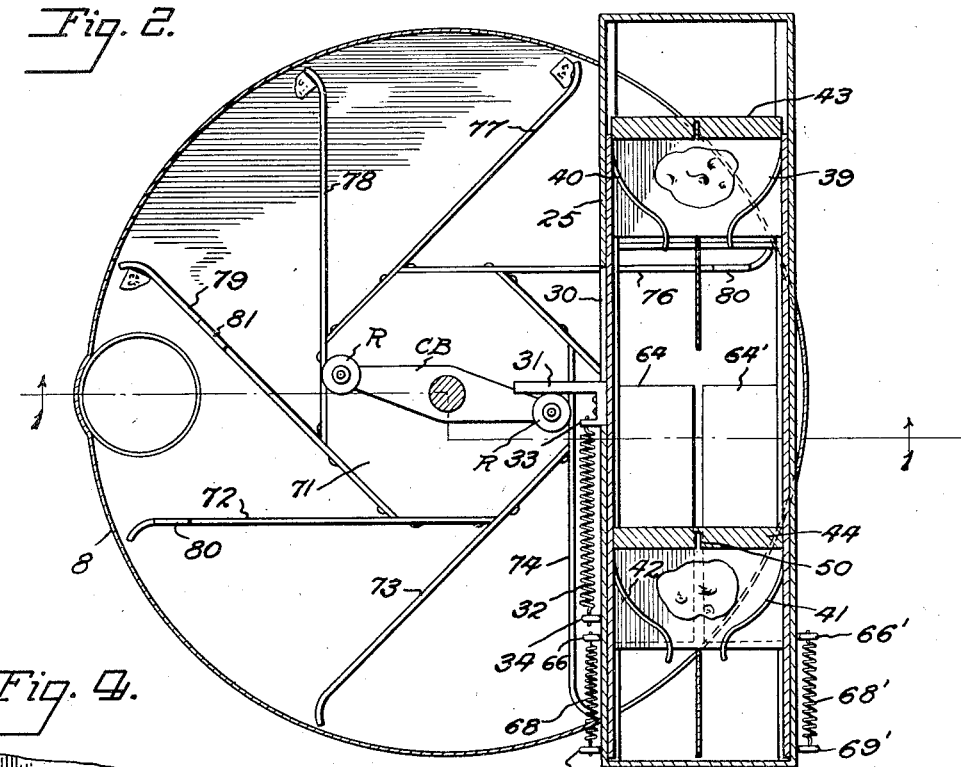
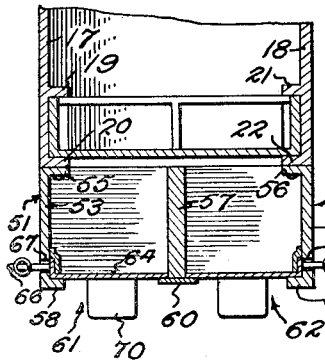
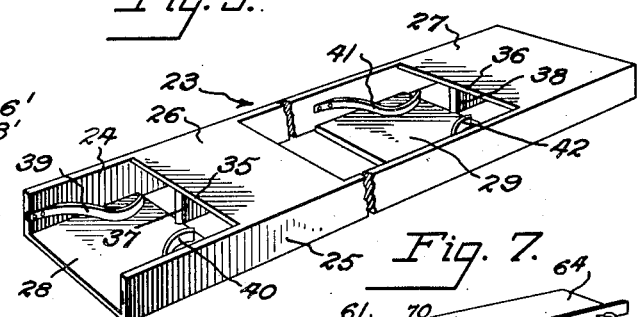
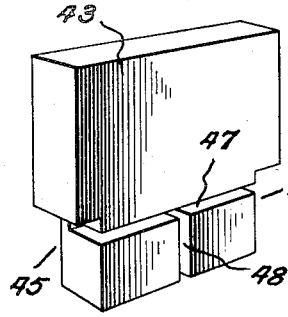
Inventor
Charles B. Herrick Patented Dec. 3, 1935

2,023,323

UNITED STATES PATENT OFFICE 2,023,323

POTATO CUTTER AND PLANTER

Charles B. Herrick, Stanley, N. Dak.

Application January 21, 1935, Serial No. 2,779

3 Claims. (Cl. 146—59)

This invention relates to potato cutters and planters and has for its main object to provide an improved construction for automatically cutting seed potatoes, and for dropping the cut portions thereof at regular intervals along a field.

Other objects of the invention will become apparent as the detailed description thereof proceeds.

In the drawings:

Figure 1 is a vertical transverse section of this apparatus taken on the line 1—1 of Figure 2;

Figure 2 is a horizontal section taken on the line 2—2 of Figure 1;

Figure 3 is a vertical transverse section taken on the line 3—3 of Figure 1;

Figure 4 is a fragmentary vertical section, to an enlarged scale, taken on the line 4—4 of Figure 3;

Figure 5 is a perspective view to an enlarged scale of cutting mechanism, illustrated in Figures 1, 2 and 3;

Figure 6 is a perspective view, to an enlarged scale, of a cutter block, forming part of this apparatus; and Figure 7 is a perspective view of a sliding bottom for one of the compartments shown in Figures 1, 3 and 4.

As shown in the drawings, the plate 1 represents part of the framework of a planter commonly used in this art, and comprising the usual wheel and seat for an operator. The invention is not concerned with these well-known details but starts with the operating shaft 2 which is suitably connected to a rotating part of the planter in order to impart the necessary movements to the several elements which make up this present invention.

The shaft 2 is mounted for rotation in a bearing block 3 which is suitably secured to the plate 1. A bevel gear 4, secured to the shaft 2, meshes with a bevel gear 5 secured to the lower end of a vertical shaft 6, extending upwardly through the bottom wall 7 of a casing 8. The upper end of the shaft 6 is seated in a socket 9 secured to the cover 10 of the said casing 8. As will be apparent from Figure 1 of the drawings the socket 9 forms one of the bearings for the said shaft 6.

The greater part of the casing 8 is cylindrical. This casing 8 is connected to a rectangular casing 11 having its opposite end projecting through the cylindrical wall of said casing 8. The upper end of the casing 11 is provided with two apertures 12 and 13 separated by the walls 14 and 15 of a hopper designated generally by the reference character 16. The side walls 17 and 18 are provided on their inner surfaces with flanges 19, 20, 21, and 22, arranged in pairs to form slides for slidably supporting the cutter member designated generally by the reference character 23.

The member 23 comprises side walls 24 and 25 connected at their upper edges by plates 26 and 27; and, at their lower edges by the plates 28 and 29. As will be apparent from Figure 5 of the drawings, the plates 26, 27, 28, and 29 are staggered to provide staggered passageways for the seed potatoes through the cutting mechanism.

The wall 17 is provided with a slot 30 in which is slidably mounted an arm 31 suitably secured to the wall 25 of the cutter member 23. A tension spring 32 is secured at one end to a lug 33 which is fixed with relation to the arm 31, and at its other end is fixed to a lug 34 projecting from the said wall 25. This spring 32 holds the cutter member normally in position to receive the seed potatoes from the hopper 16, on the plates 28 and 29 as shown particularly in Figure 3 of the drawings.

The plates 26 and 27 have their edges 35 and 36 sharpened to form horizontal cutter knives. The plate 26 has a knife 37 secured to its lower surface parallel to the sides 24 and 25 of the cutter member 23, and centered between these sides. Similarly the plate 27 has a knife 38 extending from its lower surface parallel to the said sides 24 and 25, and centered between them.

Directly above the plate 28 the inner surfaces of the side walls 24 and 25 have leaf springs 39 and 40 secured thereto; and the plate 29 has likewise arranged directly above it the leaf spring 41 and 42 suitably secured to the side walls 24 and 25. These springs, in pairs, are designed to center potatoes supported by the plates 28 and 29 with respect to the vertical cutter knives 37 and 38.

Cutter blocks 43 and 44 (see Fig. 3) are suitably secured between the walls 17 and 18 in position to hold potatoes against the cutting action of the horizontal and vertical knives 35, 36, 37, and 38.

The block 43 is provided at its opposite edges with recesses 45 and 46 to provide for the sliding movement of the walls 24 and 25 directly above the plate 28. The block 44 is provided with similar recesses to permit the sliding movement of those parts of the walls 24 and 25 directly above the plate 29. The block 43 is provided with a groove 47 adapted to receive the horizontal knife 35; and a vertical groove 48 communicating with the groove 47 is adapted to receive the vertical knife 37 which depends from the plate 26. The block 44 is provided with a horizontal groove 49 and a vertical groove 50 to receive the horizontal knife 36 formed by the plate 27, and the vertical knife 38 depending from the said plate 27.

It will be apparent from Figure 3 of the drawings that when the cutting member 23 is in its normal position, potatoes to be cut will rest upon the plates 28 and 29. When the cutting member 23 is moved to the left of its position shown in Figure 3 the potatoes will be centered relative to the vertical knives 37 and 38 by means of the spring 39, 40, 41 and 42. When the cutting member has been moved to its extreme left position the horizontal plates 26 and 27 will support the upper portions of the potatoes; and the two parts of the lower portions of said potatoes will be dropped into the compartment directly below the hopper.

In Figure 3 of the drawings the compartment 51 is shown as directly below the plate 28 when the cutting member is in its normal position. Similarly the compartment 52 is shown directly below the plate 29 when the cutting member is in its normal position. Each of these compartments comprises the same parts identically constructed. Accordingly, only one of them, the compartment 51, will be described in detail. As shown in Figure 4 of the drawings, the compartment 52 comprises side walls 53 and 54 suitably secured at their upper ends by flanges 55 and 56 to the flanges 20 and 22, respectively, formed at the bottom edges of the walls 17 and 18. A partition 57 separates the compartment 51 from the compartment 52, each of which receives one-half of the lower part of a potato severed by the horizontal and vertical knives 36 and 38.

The lower edges of the walls 53 and 54 are provided with inturned flanges 58 and 59, which cooperate with a plate 60, fixed to the lower edge of partition 57 to support the sliding bottoms 61 and 62. The bottom 61 comprises a runner 63 having the plates 64 and 65 spaced apart along and projecting laterally from the lower edge thereof.

The runner 63 has an eyelet 66 projecting therefrom and slidably arranged in a slot 67 formed in the wall 51 near the lower edge thereof. A tension spring 68 having one end secured to the eyelet 66 and its other end secured to an eyelet 69 fixed to wall 53, holds the bottom 61 normally in position to receive the sections of potatoes after an operation of the cutter member 23. A lug 70 projects from the lower face of plate 64 into the path of movement of striker members to be described later in detail.

The elements in compartment 52 corresponding to the elements in compartment 51, are designated by the same reference numerals primed.

To reciprocate the cutter member 23 in its slide the shaft 6 has secured thereto a cross bar CB having rollers R pivoted at its opposite end to rotate about substantially vertical axes. It will be evident from Figures 1 and 2 of the drawings that the cutter member 23 will be moved in one direction, toward the left as shown in Figure 3, by the wiping action of the rollers R on the arm 31 which is secured to the side 25 of the aforesaid cutter member. After completion of the wiping action of these rollers on the arm 31, the spring 32 will return the cutter member 23 to its normal position shown in Figures 2 and 3 of the drawings.

To operate the sliding bottoms of the compartments 51 and 52, the shaft 6 has secured thereto an octagonal block 71 having secured to the faces thereof the scraper arms 72, 73, 74, 75, 76, 77, 78; and 79. The scraper arms 79 and 75 are each provided with a lug 81 projecting upwardly near the outer ends thereof; and the scraper arms 72 and 76 are each provided with a lug 80 spaced inwardly from the outer ends at a certain distance necessary to make wiping contact with the lug 70 on the bottom 61 during the rotation of the shaft 6. The lugs 80 are spaced along their arms in position to make wiping contact with the lug 70' on the bottom 61' of the compartments.

It will be apparent from the drawings that when the shaft 6 is rotated, the rollers R wiping against the arm 31 will effect a cutting movement of the cutter member 23. The same rotation will cause the scraper arms to rotate under the compartments 51 and 52. The lugs 80 and 81 on the scraper arms will wipe against the lugs 70 and 70' on the sliding bottoms of the compartment, in alternation, to cause the potato cuttings to drop at spaced apart intervals upon the surface of the bottom of the casing 8. This rotation will of course, bring the cuttings over the opening 82 of the outlet conductor 83 which is suitably arranged on the planter to feed the cutting at spaced apart intervals along the field. It will be evident too, that the cutting occurs only while the scrapers 73, 74, 77 and 78, having no projecting lugs, pass beneath the compartments.

What I claim is:

1. Seed potato cutter and planter comprising a hopper having a discharge port, a knife box reciprocable beneath said discharge port including a trough-shaped carriage having a knife-set, and a platform in advance of the knife-set forming a partial bottom of said carriage, and a rest for a potato from said hopper, while being cut, the knife-set comprising a horizontal knife bridging the top of said carriage, and one or more vertical knives located beneath said horizontal knife, said carriage beneath said knife-set being bottomless to discharge the cut seed pieces, means forming a compartment beneath said knife box for receiving seed pieces from the latter, having partitions dividing said compartment into chambers individual to the respective seed pieces cut by said knife-set, normally spring closed doors at the bottom of said chambers, and a rotary conveyor beneath said compartment moving synchronously with said carriage having conveyor elements adapted successively to open the doors of said chambers, each element receiving therefrom a seed piece, and sweeping the same at determined intervals into a common discharge.

2. Seed potato cutter and planter comprising a hopper having a discharge port, a knife box reciprocable beneath said discharge port including a trough-shaped carriage having a knife set, and a platform in advance of the knife-set forming a partial bottom of said carriage, and a rest for a potato from said hopper, while being cut, the knife-set comprising a horizontal knife bridging the top of said carriage, and one or more vertical knives located beneath said horizontal knife, said carriage beneath said knife-set being bottomless to discharge the cut seed pieces, means forming a compartment beneath said knife box for receiving seed pieces from the latter, having partitions dividing said compartment into chambers individual to the respective seed pieces cut by said knife-set, normally spring closed doors at the bottom of said chambers, a driven shaft having a rotary cam engageable with an element on said knife box for reciprocating the latter in one direction, a spring returning said knife box, a conveyor on said shaft having arms, means on said arms adapted successively to open the doors of said chambers for discharging a seed piece from said chambers to said arms, the latter sweeping said seed pieces at determined intervals into a common discharge.

3. Seed potato cutter and planter comprising a casing, a hopper at the upper end having spaced discharged ports, the bottom of said casing being a circular conveyor chamber, a guideway beneath said hopper, a reciprocating knife box in said guideway, seed piece compartments below said carriage and beneath the respective discharge ports, each compartment having a normally spring closed bottom door emptying into said conveyor chamber, means within said casing for reciprocating said carriage, the latter being trough-shaped having a knife-set for each hopper discharge port, and a platform in advance of each knife-set, said platforms being situated beneath said hopper discharge ports in the inactive position of said knife carriage, upon each of which a potato rests upon being discharged from said hopper, said platforms forming a partial bottom of said trough, said knife-sets each comprising a horizontal knife plate bridging the top of said trough and one or more vertical knife plates depending from said horizontal knife plate and extending in the direction of reciprocation of said carriage, said trough being bottomless beneath said knife-sets, and abutments having grooves to receive the edges of said knives, at the end of the cutting stroke of said knife carriage, a conveyor in said conveyor chamber synchronously driven with respect to said knife carriage having elements adapted successively to open the doors of said compartments receiving therefrom seed pieces and sweeping the same at determined intervals into a common discharge.

CHARLES B. HERRICK.